(12) United States Patent
Porio et al.

(10) Patent No.: US 9,172,751 B2
(45) Date of Patent: Oct. 27, 2015

(54) CONTENT DISTRIBUTION

(75) Inventors: Jyrki Tauno Johannes Porio, Vantaa (FI); Olli Johannes Karonen, Helsinki (FI); Pekka Ilmari Lahtinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1418 days.

(21) Appl. No.: 12/081,034

(22) Filed: Apr. 9, 2008

(65) Prior Publication Data

US 2009/0259710 A1 Oct. 15, 2009

(51) Int. Cl.
*G06F 15/16* (2006.01)
*H04L 29/08* (2006.01)
*H04L 29/06* (2006.01)

(52) U.S. Cl.
CPC ............ *H04L 67/104* (2013.01); *H04L 67/108* (2013.01); *H04L 67/1068* (2013.01); *H04L 67/16* (2013.01); *H04L 65/4076* (2013.01); *H04L 67/06* (2013.01)

(58) Field of Classification Search
USPC .................. 709/201, 204, 231, 236, 219, 223
See application file for complete search history.

(56) References Cited

U.S. PATENT DOCUMENTS

| | | | |
|---|---|---|---|
| 2006/0013192 A1* | 1/2006 | Le et al. ........................ | 370/351 |
| 2007/0294737 A1 | 12/2007 | Edwards et al. | |
| 2009/0031007 A1* | 1/2009 | Boic et al. ..................... | 709/219 |
| 2009/0113204 A1* | 4/2009 | Raniere ........................ | 713/153 |

FOREIGN PATENT DOCUMENTS

WO WO 2008/012488 A2 1/2008

OTHER PUBLICATIONS

Fonseca et al., BitTorrent Protocol—BTP/1.0, Apr. 2005 (rev. 1.33), accessed Jun. 16, 2010 at <http://jonas.nitro.dk/bittorrent/bittorrent-rfc.html>.*

Skevik et al., Analysis of BitTorrent and its use for the Design of a P2P based Streaming Protocol for a Hybrid CDN, University of Oslo, Jun. 2004.*

EP Search Report for EP Application No. 09157467.3, dated Sep. 2, 2009.

Jelle Roozenburg, *Secure Decentralized Swarm Discovery in Tribler*, Parallel and Distributed Systems Group, Delft University of Technology, Nov. 10, 2006, pp. 1-112, XP002542478.

Ruben Cuevas et al., Bittella: *A Novel Content Distribution Overlay Based on Bittorrent and Social Groups*, On the Move to Meaningful Internet Systems 2007: OTM 2007 Workshops, Springer Berlin Heidelberg, vol. 4806, Nov. 25, 2007, pp. 991-1000.

(Continued)

*Primary Examiner* — Jude Jean Gilles
(74) *Attorney, Agent, or Firm* — Alston & Bird LLP

(57) ABSTRACT

A method and apparatus is configured to generate a first message including a portion of a media stream or a portion of a data file. The method and apparatus also generates a second message including the first message, for sending to one or more addressees. The second message also includes information identifying one or more additional entities other than the one or more addressees from which one or more portions of the media stream or the data file can be obtained.

18 Claims, 4 Drawing Sheets

(56) References Cited

OTHER PUBLICATIONS

Fonesca J. et al., *Bit Torrent Protocol—BTP/1.0*, Internet Citation, XP002418253, Feb. 2, 2007, pp. 1-13

*Peer Exchange* [online], Feb. 1, 2008, pp. 1-1, XP002542472, whole document.

Alex Jantunen, et al.; "Peer-to-Peer Analysis"; Feb. 27, 2006; 28 pages.; version 1.0.

Skevik, K. et al., *Analysis of BitTorrent and Its Use for the Design of a P2P Based Streaming Protocol for a Hybrid CDN*, Department of Informatics, University of Onslo, (undated), pp. 1-19.

BitTorrent Protocol version 1.0 $Revision: 1.33 $: BitTorrent Protocol—BTP/1.0 [online] [retrieved May 2, 2011]. Retrieved from the Internet: <URL: http://jonas.nitro.dk/bittorrent/bittorrent-rfc.html>. 1 page.

\* cited by examiner

GENERATE AT A SECOND, VIEWING ENTITY OF A NETWORK A MESSAGE REQUESTING A PORTION OF A VIDEO STREAM FOR SENDING TO A THIRD, VIEWING ENTITY OF THE NETWORK IDENTIFIED IN INFORMATION RECEIVED FROM A FIRST ENTITY OF THE NETWORK FROM WHICH THE SECOND ENTITY HAS RECEIVED A FURTHER PORTION OF SAID VIDEO STREAM

↓

SENDING SAID MESSAGE FROM SAID SECOND ENTITY TO SAID THIRD ENTITY

FIG. 4

GENERATE AT A METADATA SERVER OF A NETWORK A MESSAGE FOR SENDING TO A SEEDER ENTITY OF A VIDEO STREAM, SAID MESSAGE INCLUDING INFORMATION IDENTIFYING ONE OR MORE OTHER ENTITIES OF THE NETWORK FROM WHICH ONE OR MORE PORTIONS OF SAID VIDEO STREAM CAN BE OBTAINED

↓

SENDING SAID MESSAGE FROM SAID METADATA SERVER TO SAID SEEDER ENTITY

FIG. 5

CONTENT DISTRIBUTION

The present invention relates to a technique for facilitating the distribution of content. In one embodiment, it relates to a technique for facilitating the peer-to-peer (P2P) distribution of internet protocol television (IPTV).

Peer-to-peer (P2P) file sharing is a common technique for sharing large files in an efficient way: a swarm of Internet hosts (i.e. computers connected to the Internet) distribute a file in such a way that each host can download the file not only from the original source of the file (called seeder), but from other hosts as well. One or more hosts, called trackers, keep track of the swarm. Such file sharing is traditionally a background activity without time constraints: each host wishing to download a file uses a program to locate the file to be downloaded and a server known as a tracker associated with it, then learns the redistribution swarm and joins it, and gradually downloads the file from the various hosts in the swarm.

The first P2P distribution techniques used a centralized tracker which indicated where the desired files were available for download; in such protocols swarms for file redistribution were not of interest. Today, both the tracker functionality and the redistribution may be decentralized.

Recently similar P2P techniques have been devised for real-time data distribution, too: one major example is video streaming like P2P IPTV, a collection of video distribution techniques where a video stream originating from a seeder host is received by multiple hosts which participate in the distribution—by forming a peer-to-peer swarm for real-time data distribution.

It is anticipated that individual human users, too, will eventually originate P2P IPTV video streams, as User Originated (UO) P2P IPTV. One special case of UO P2P IPTV is mobile P2P IPTV, where the seeder of the video stream and/or many consuming hosts of it may be mobile devices. For instance, since mobile devices like cellphones often contain a video capable camera, mobile devices can shoot video whenever something of public interest is encountered, and distribute it to viewers as mobile P2P IPTV.

A very dynamic situation arises where mobile P2P IPTV video streams spontaneously emerge and then end, and devices must join the P2P distribution swarm quickly to receive the video stream.

The dynamic situation above creates two problems:
stream discovery, i.e. how potential receivers of a UO P2P IPTV video stream (mobile or not) discover the availability of the video stream in real time, to join as viewers of it, and
swarm initialization, how a new device to be used for receiving the video stream locally sets up the information of, and efficiently joins the P2P distribution swarm for the video stream.

Swarm initialization is especially challenging when the flash crowd effect takes place, i.e. when a P2P IPTV video stream with a high demand begins, and large numbers of receivers simultaneously wish to join the swarm.

US2007/0294737 describes an IPTV stream management technique in a system where a plurality of IPTV streams are presented on a plurality of viewing devices of a home viewing network.

WO2008/12488 describes a peer-to-peer set-top box system and the distribution of video content among digital TV subscribers.

It is an aim of the present invention to provide a new technique for facilitating the distribution of a media stream or a data file.

According to one aspect of the present invention, there is provided an apparatus which is configured to: generate a first message including a portion of a media stream or a portion of a data file; and generate a second message comprising the first message and for sending to one or more addressees, said second message further comprising information identifying one or more additional entities other than said one or more addressees from which one or more portions of said media stream or said data file can be obtained.

In one embodiment, said second message is generated on the basis of information received from a managing entity associated with the distribution of said media stream or said data file, and the apparatus is further configured to thereafter: generate a third message for sending to one or more addressees, said third message including a further portion of said media stream or said data file; and generate a fourth message comprising said third message and for sending to said one or more second entities, said fourth message further including information identifying one or more additional entities other than said one or more addressees from which one or more portions of said media stream or said data file can be obtained, and which is generated on the basis of updated information received from said managing entity associated with the distribution of said media stream or said data file.

In one embodiment, said second message is generated on the basis of information received from a node which is one of: an addressee, an additional entity or a node in communication with at least one addressee or additional entity in a peer-to-peer network.

According to another aspect of the present invention, there is provided apparatus which is configured to: participate in a first distribution of a media stream or data file; store information on entities involved in a second distribution of a media stream or data file; and generate one or more messages inviting said entities to participate in said first distribution of a media stream or data file.

According to another aspect of the present invention, there is provided apparatus which is configured to: receive a portion of a media stream or data file together with first information identifying the address of one or more entities involved in the distribution of said media stream or data file; forward said portion of a media stream or data file to another entity together with second information identifying the address of one or more entities involved in the distribution of said media stream or data file, wherein said second information includes said first information and the address of said apparatus.

According to another aspect of the present invention, there is provided a method comprising: generating at a first entity of a network a first message for sending to one or more second entities of a network, wherein said first message includes a portion of a media stream or a data file; and generating at said first entity a second message for sending to said one or more second entities, said second message including information identifying one or more third entities other than said first entity and said one or more second entities and from which one or more other portions of said media stream or said data file can be obtained.

In one embodiment, the method further comprise generating said second message on the basis of information received from a managing entity associated with the distribution of said media stream or data file, and thereafter generating a third message for sending to one or more second entities of said network, said third message including a further portion of said media stream or said data file; and generating a fourth message for sending to said one or more second entities, said fourth message including information identifying one or more third entities other than said first entity and said one or more second entities and from which one or more portions of said media stream or said data file can be obtained, and which is generated on the basis of updated information received from said managing entity associated with the distribution of said media stream or said data file.

In one embodiment, the method further comprises generating said second message on the basis of information received from a node which is one of: an addressee, an additional entity or a node in communication with at least one addressee or additional entity in a peer-to-peer network.

According to another aspect of the present invention, there is provided a method for use at a network entity participating in a first distribution of a media stream or data file; the method comprising: storing information on entities involved in a second distribution of a media stream or data file; and generating one or more messages inviting said entities to participate in said first distribution of a media stream or data file.

According to another aspect of the present invention, there is provided a method comprising: receiving at a first entity a portion of a media stream or data file together with first information identifying the address of one or more entities involved in the distribution of said media stream or data file; and forwarding said portion of a media stream or data file to another entity together with second information identifying the address of one or more entities involved in the distribution of said media stream or data file, wherein said second information includes said first information and the address of said first entity.

According to another aspect of the present invention, there is provided apparatus, which is configured to: generate at a second entity a message requesting a portion of a media stream or a data file for sending to a third entity of the network identified in information received from a first entity from which the second entity has received a further portion of said media stream or data file.

In one embodiment, said further portion of said media stream was received in reply to a request from the second entity to the first entity for a portion of said media stream or data file.

According to another aspect of the present invention, there is provided a method comprising: generating at a second entity a message requesting a portion of a media stream for sending to a third entity of the network identified in information received from a first entity from which the second entity has received a further portion of said media stream or data file.

In one embodiment, said further portion of said media stream or said data file was received in reply to a request from the second entity to the first entity for a portion of said media stream or said data file.

According to another aspect of the present invention, there is provided apparatus, which is configured to: generate at a managing entity of a network a message for sending to an originator entity of a media stream or a data file, said message including information identifying one or more other entities of the network from which one or more portions of said media stream or said data file can be obtained.

According to another aspect of the present invention, there is provided a method comprising: generating at a managing entity of a network a message for sending to an originator entity of a media stream or a data file, said message including information identifying one or more other entities of the network from which one or more portions of said media stream or said data file can be obtained.

According to another aspect of the present invention, there is provided a computer program product comprising program code means which when loaded into a computer controls the computer to perform any of the methods described above.

A detailed description of embodiments of the present invention is provided hereunder, by way of example only, with reference to the accompanying drawings, in which:

FIG. 4 illustrates the actions of a viewing device operating in accordance with an example embodiment of the present invention; and FIG. 5 illustrates the actions of a metadata server operating in accordance with an example embodiment of the present invention.

Figure 1:
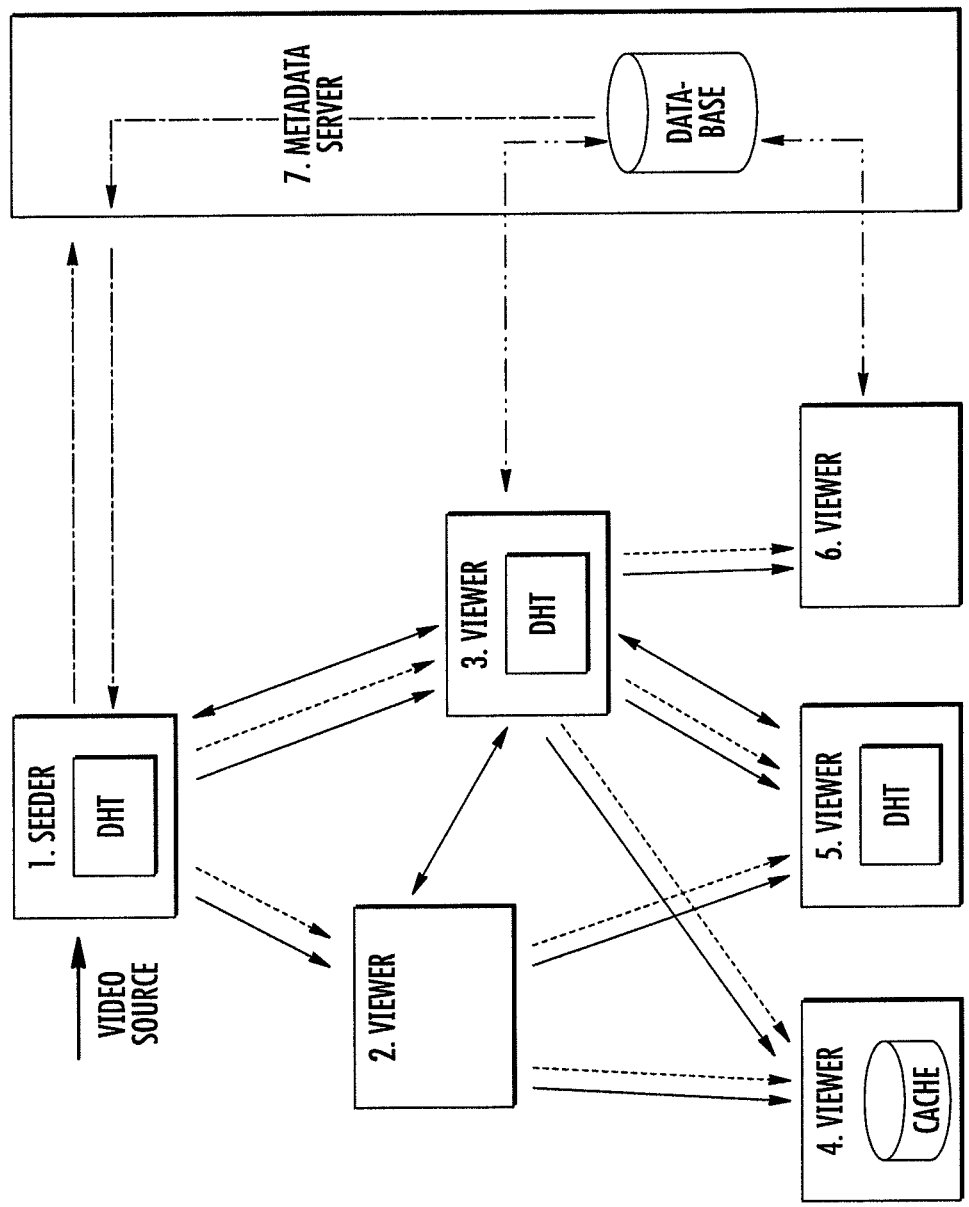
FIGS. 1 and 2 illustrate the combined actions of a seeder device, viewing devices and metadata server operating in accordance with an example embodiment of the present invention.

FIG. 1 illustrates an example of a technique according to an embodiment of the present invention. Here, for the purpose of explanation, a simple swarm is shown consisting of a seeder device 1 and viewer devices 2 to 6. Once the viewers have joined the swarm, both the video and the metadata are streamed from the seeder to the viewers (directly or in a P2P fashion through some devices in the swarm). Seeder 1 informs metadata server 7 about the video stream, and later receives information about the viewers to be inserted at least partially into the stream as metadata. Viewers 3 and 6 learn about both the video stream and the current swarm from metadata server, and at the same time they are recorded as viewers to the metadata server database 7. Devices 1, 3 and 5 implement a distributed hash table, from which viewers 2 and 5 learn about the current swarm. Viewer 4 has a swarm cache which helps it join the swarm. In FIG. 1: the single lines indicate video streaming; the double lines indicate metadata transfer; the triple lines indicate distributed hash table (DHT) maintenance or retrieval; the solid lines indicate streaming and the dashed lines indicate data transfer according to other non-streaming protocols. DHT is illustrated as an example of database type usable with embodiments of the present invention.

Figure 2:
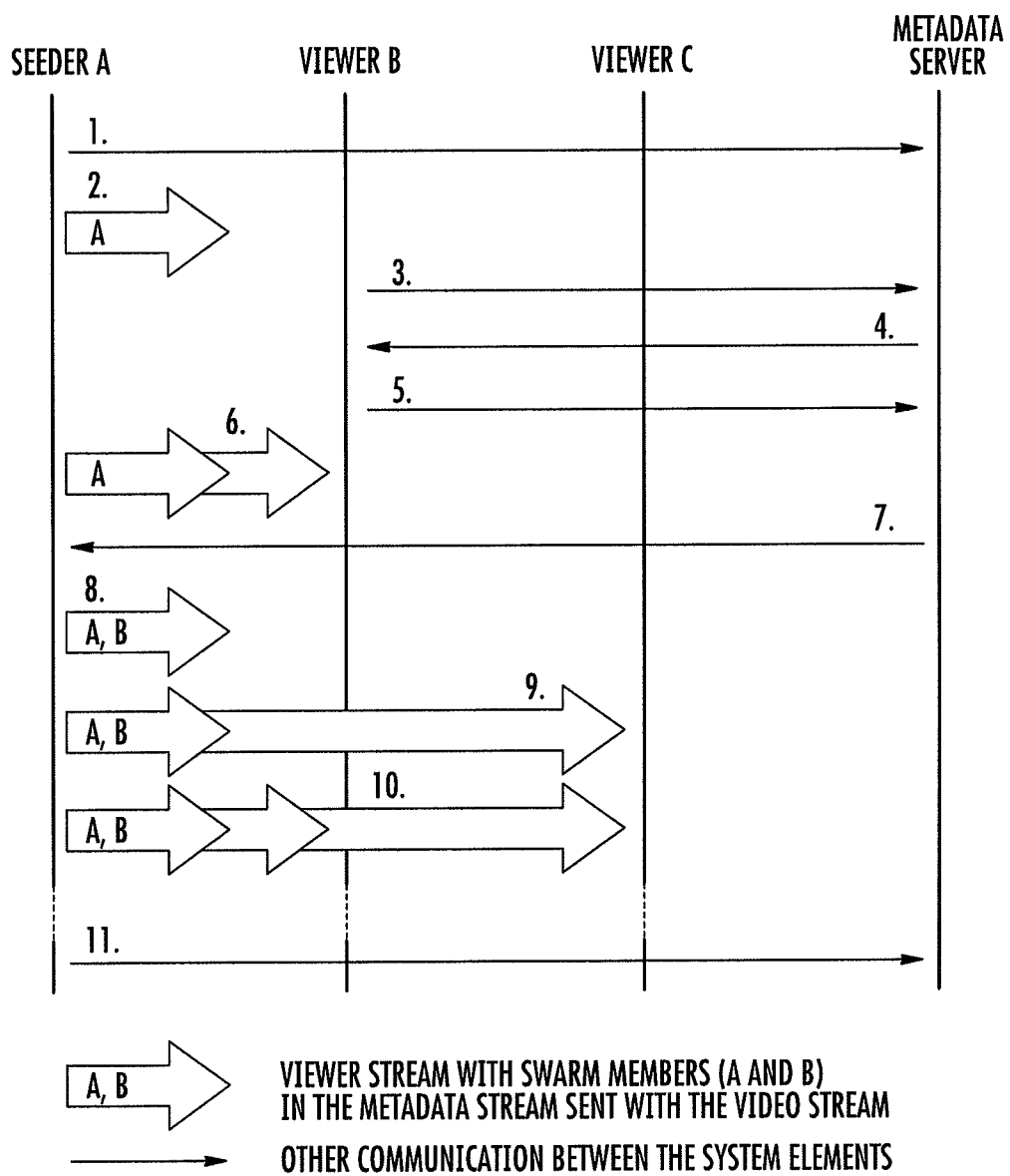
Figure 3:
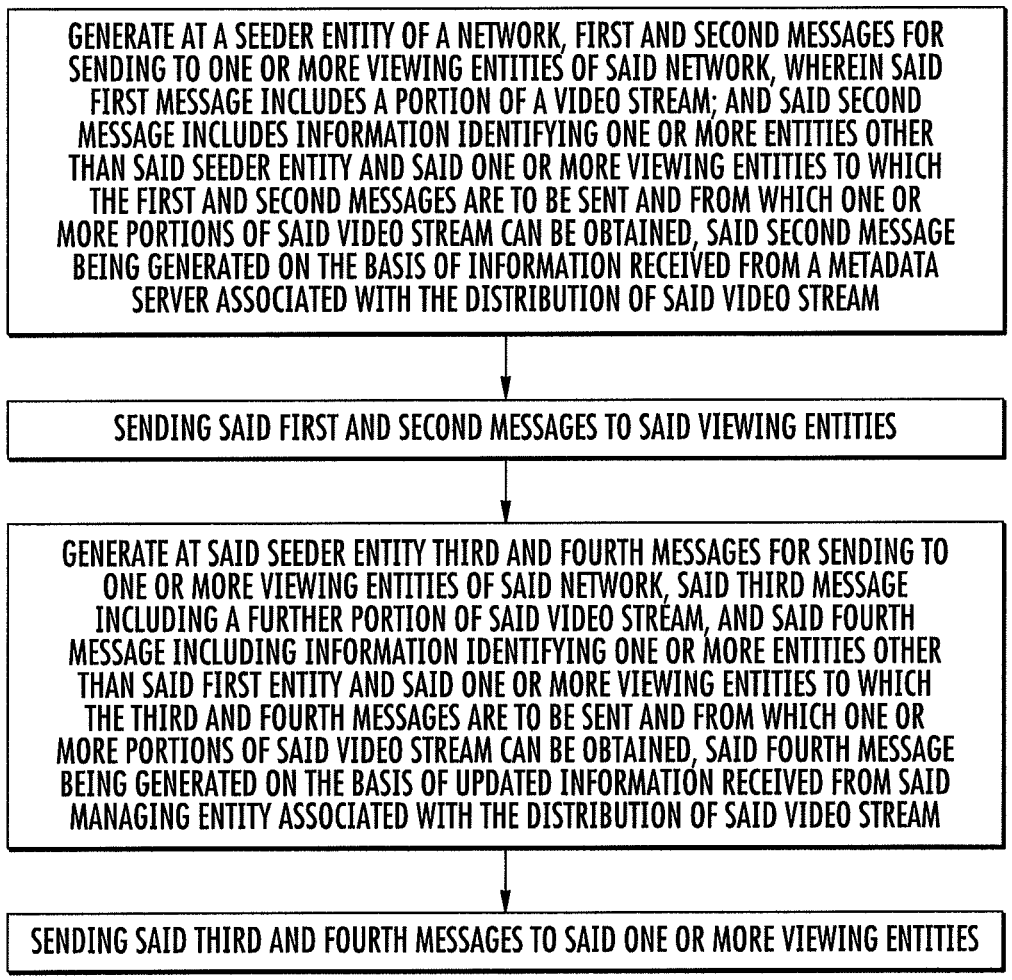
FIG. 3 illustrates the actions of a seeder device operating in accordance with an example embodiment of the present invention.

FIG. 2 partially illustrates the interactions between a video stream seeder A, two video stream viewers B and C, and the metadata server in an example case. (1.) Seeder A indicates to the metadata server that it will (2.) initiate the sending of a video stream, with a metadata stream indicating itself ("A" here meaning its own address) as a member of the P2P distribution swarm of the stream. In phase (3.) device B queries the metadata server for a video stream to view, and (4.) receives a list of streams known to the metadata server, including the stream indicated by A in phase (1.), with A as the only known member of the distribution swarm of that stream. The user of device B picks the video stream by A for viewing, which (5.) device B indicates to the metadata server, and (6.) joins the distribution swarm to start viewing the video stream. In a later phase with a larger distribution swarm, A may not learn this directly; therefore the metadata server at a suitable occasion (7.) tells new members of the distribution swarm known to it (B in this case) to A, which (8.) updates the list of swarm members in the metadata stream. Now assume that (9.) device C joins the swarm as a viewer by contacting seeder A directly, without consulting the metadata server and learning the swarm members from it; device C then learns the swarm members from the metadata stream sent with the video stream, and (10.) may make use of them to optimize the swarm and stream reception. The overall process continues like this, with new viewers joining and leaving the swarm (not shown in Figure), until (11.) seeder A ceases to send the video stream and indicates this to the metadata server, which removes the video stream and its distribution swarm from its database. In FIG. 2: the block arrows indicate a video stream and a metadata stream sent with the video stream, the metadata stream including information identifying the swarm members; and the line arrows indicate other kinds of communications between the system elements. A video stream is employed in the example embodiment of FIG. 2. In other embodiments of the invention another type of media stream may be employed in stead of a video stream. Examples include file or music sharing.

In this embodiment, the metadata server is used to (a) provide a source of information for potential viewers to discover the media stream; and (b) pass swarming information for swarm initialization to the seeder to be included in the streaming metadata sent out from the seeder. The metadata server also feeds swarming information to other hosts in the swarm to be passed in the streaming metadata sent from those hosts.

This embodiment also involves the use of distributed hash tables (DHT) maintained by supernodes (1, 3, 5) with public IP addresses. This embodiment also involves the use of swarm caching, in which hosts store old swarm information in their local mass memories to help them re-join the video stream distribution swarm (or channel of video streams, like a conventional television channel) later.

Other features of this embodiment are as follows.

Devices which start viewing a stream, report so to the metadata server, and at the same time receive information about the stream seeder and the earlier viewers—i.e. the current P2P distribution swarm—to initialize their local swarm data and (subsequently) to join the swarm using the P2P distribution protocols.

If a device ceases to receive the stream prior to the stream termination, it reports this, too, to the metadata server, in order to be removed from the swarm data. The metadata server effectively acts as the centralized tracker of the P2P distribution swarm, but swarm data maintenance (from the metadata server point of view) and swarm data download to devices (from the device point of view) are side effects of stream discovery, and swarm initialization in devices, based on the downloaded swarm data, can be much faster than with prior art P2P IPTV techniques.

If all hosts wishing to view the P2P video stream were to contact the metadata server, to obtain information about the stream seeder and earlier viewers, this would make the metadata server both a critical component and a potential bottleneck of swarm initialization, especially in flash crowd situations. In this embodiment, because the streaming metadata sent out by hosts also carries swarming information (in addition to metadata used for other purposes), when a new viewer discovers the stream by a method other than via the metadata server, (for example, by discovering the stream via an earlier member of the swarm (i.e. device in the swarm)), it can obtain information about the identity of more members of the swarm from the swarming information received in the streaming metadata along with the P2P video stream itself (and therefore does not need to obtain such information from the metadata server, thus reducing the load on the metadata server). This mechanism makes the metadata server an optional feature in some embodiments. In one example embodiment, viewer devices may invite devices known to them to join the swarm. To accomplish this, the devices may be configured to store group information, such that other members of a group are invited based on the content of the swarm and past swarming associations, for example.

One way to accumulate swarming information into the streaming metadata is the following. Each device distributing the video stream and associated streaming metadata adds its own IP address to the metadata before re-distributing them to other devices.

The streaming metadata may be included in the stream transmitted from the seeder (or a viewing device functioning as a secondary provider) in a variety of ways. For example, the media or file format transmitted may be modified to include fields for the streaming metadata, or the seeder (or a viewing device functioning as a secondary provider) may transmit the content in a standard video, music or file format but transmit associated packets that nodes participating in the swarm according to the present invention will be able to associate with the stream, so as to enable use of the streaming metadata for distributing the content in the swarm. Another example is that the seeder may use standard video, music or file formats but include in the same packets the associated streaming metadata. In both the case that the streaming metadata is in the same packet and the case that it is on the same network layer, the distributed content and streaming metadata may be considered to form a single message which comprises both content and streaming metadata.

In this embodiment, the metadata server periodically feeds swarming information to the seeder of the video, which is the source of the streaming metadata as well (or to another P2P host near the seeder).

In this embodiment, the seeder device obtains the video from some video source (such as, for example, a local video camera); streams out the video and streaming metadata to at least one viewer device, optionally, reports the start and end of the video stream to metadata server; and receives swarm addresses from the metadata server to be inserted into streaming metadata.

In embodiments where the metadata server is absent, the devices may report the accumulated swarming information directly to the seeder.

In one embodiment, the metadata server also functions as a video guide server, where viewing devices can look for video streams for viewing. One function of the metadata server may be as a video & metadata stream distribution swarm information server, in which role it (a) stores contact information (such as IP addresses) for swarm members, i.e. the addresses of the seeder device and viewing devices; (b) hands out swarm member addresses to users of the video guide, to enable said users to efficiently join the swarm should they pick a particular video stream for viewing; and (c) on suitable occasions updates the swarm member addresses to the seeder of the video & metadata stream, to be injected by the seeder into the metadata stream.

Embodiments may also include one or more DHT databases. These may be provided at an automatically chosen group of swarm members with public IP addresses. When present, they may implement a DHT for the swarm where video stream identities and viewers' IP addresses (i.e. the swarm addresses) are stored and the IP addresses can be retrieved based on the video stream identities. The content of the DHT databases (i.e. the list of swarm members) may be automatically updated as DHT clients leave the DHT and the video stream distribution swarm.

The viewer devices 2, 3, 4, 5 and 6 in the embodiment of FIG. 1 are members of the video & metadata stream distribution swarm, and may collect stream data from a plurality of other members of the swarm. This stream data may be used by the viewer devices for local display (i.e. viewing by a human user) of the video and/or for passing the video & metadata stream to other members of the swarm.

A media-stream can contain several sub-streams corresponding to different components of the media. Typical components are for example video data, audio data, timestamps, codecs parameters etc. Additionally, a media-stream can contain small amounts of metadata for generic purposes. In this embodiment we apply the said metadata-component to pass P2P information between users. When the human user of a device watches a video over the network, the device will simultaneously receive some P2P data it needs to ensure that it will get the video data in future as well. Unlike video, audio, codec data etc., the P2P data is locally not consumed by the video player application (for displaying to the human user), but by the P2P streaming program product (or alike) of this embodiment.

Viewer devices may implement a swarm cache for the stream viewed. Viewer devices may use the metadata server as a video guide server to find video streams for viewing, and, once a stream is selected by a human user, initialize their swarm cache and stream reception based on the swarm data provided by the metadata server as a swarm information server. Viewer devices may also use the swarm cache when returning to a video stream after leaving it.

Viewer devices may also use the DHT database method for swarm data initialization.

While viewer devices receive (and pass on) the video & metadata stream, they maintain their swarm data based on the metadata stream received.

To act in its roles of video guide server and swarm information server, the metadata server is provided with a database listing the current video streams known to it. For the example of video programming, there may exist a predetermined set of channels, each having none or one or more current video streams on them.

The database may be a relational database including a channels table which lists channel names and descriptions, such as shown below.

| Channels | |
|---|---|
| field Name | field description |
| channel-key | database key of the channel |
| channel-name | name of the channel |
| channel-desc | textual description of the channel |

With such a table, viewer devices may browse the available channels and the video streams which currently may be streamed on them. The video streams might be listed in a streams table, containing the channels table key (channel-key) for searching by channel, such as shown below.

| Streams | |
|---|---|
| field name | field description |
| channel-key | (refers to channel data in channels) |
| stream-key | database key of the video stream |
| stream-name | name of the program contained in the video stream |
| stream-desc | textual description of the stream |

The name and description of a video stream may be fed into the metadata server database as the seeder device indicates the beginning of the streaming (step 1 in FIG. 2).

At a viewer device browsing the video guide server of the metadata server for a video stream to view, the content of those tables (as retrieved from the metadata server, step 4 in FIG. 2) might be presented as a table of channel and stream name pairs, with a more detailed description of the stream available when selecting a stream name.

The metadata server database may also include swarm information. The swarm information might, for example, be stored as the following table.

| stream-swarm-members | |
|---|---|
| field name | field description |
| stream-key | (refers to streams) |
| is-a-seeder | true or false, is this device a seeder for the swarm? When the seeder (or the last seeder if multiple ones are supported) leaves the swarm, the swarm is deleted. |
| address | address information, such as IP address, for the purpose of joining the swarm of this stream |

For each stream, the list of addresses is passed to the viewing devices (again in step 4 of FIG. 2). If a viewing device joins the swarm and begins viewing the stream, its address is added to this table (as the consequence of step 5 in FIG. 2).

Hereunder is an example of a simplified algorithm for a viewer device to follow when wishing to join a swarm associated with a video stream X whose identity is already known to the viewer device.

1. Contact metadata server to find (part of) swarm addresses.

If 1 fails, 2. query a DHT for the video stream X to find (part of) swarm addresses.

If 2 fails, 3. look up earlier swarm addresses for video stream X (or channel etc.) from its own local swarm cache, and contact the addresses to find one viewing the video stream X now.

If 3 fails, 4. look up earlier swarm addresses for other video streams (or channels etc.) from the local swarm cache, and contact the addresses to find one viewing the video stream X now.

If 4 fails, 5. look up a metadata stream carrying swarm data for multiple video streams, and wait for video stream X to come up among the data, while also re-trying the earlier steps.

Once the viewer device has successfully joined the swarm for video stream X, it can receive more up: to: date swarm data from the metadata stream carried along with the media stream. Should the quality of the video stream received prove to be poor, due to missing video fragments (which is caused by the number of swarm members known to the viewer device being less than the total number of swarm members for video stream X, which may itself be a result of swarm partitioning), the algorithm can be reiterated from step 1, to learn the identity of more swarm members for video stream X.

If the number of simultaneous new viewers is small, and the metadata server is on line, all accesses to the metadata server (step 1 in the above algorithm) are likely to succeed. However, when the number of simultaneous new viewers is very large, resulting failures to access the metadata server and/or the DHT database will not inhibit the formation of a functional swarm because the swarm information is also provided in the metadata stream sent to viewing devices other than via the metadata server (or the DHT database).

In addition to feeding the seeder with the addresses of the swarm associated with the seeder's video stream, the metadata server may also feed the seeder with addresses of distribution swarms of other video streams for the seeder to additionally insert into its metadata stream. This can facilitate viewer devices switching between video streams.

As mentioned above, some viewer devices may use DHTs to join the swarm. The metadata server may also query the addresses of a swarm from a DHT database to update its own swarm database and, eventually, the metadata stream from the seeder.

In one variation, the metadata server does not function as a video guide server (the video guide function may be provided by a separate server), but is dedicated solely to the assistance of swarm formation, as a swarm information server.

A DHT may serve the swarm of one video stream only, or it may serve the swarms of a plurality of video streams, in view of the fact that viewers are likely to move from viewing one video stream to viewing another. Likewise, a swarm cache at a viewer device may contain swarm data about not only the currently viewed video stream, but also swarm data for other video streams.

The video stream may, for example, be a real-time broadcast television channel (with a name and a description), a near-video-on-demand stream with multiple simultaneous viewers, a spontaneously originated video stream from e.g. a publicly interesting event, or any other kind of video stream suitable for P2P distribution.

In addition to passing on the swarm data as received (indirectly or directly) from the seeder device, viewer devices may also add their own address into the swarm data (to be passed on "downstream" to other viewer devices), if it is not already included there.

Swarm information for many video streams may be included in a single metadata stream.

In a flash crowd situation, viewing devices (and also the seeder device) may respond to requests from other viewer devices using swarm data from their swarm cache. Such a viewing device (swarm node) may return to the requester its history of input streams and may also return information about several swarms and streams.

A dedicated stream may be devoted to the sole purpose of distributing swarm bootstrap information for several streams (channel set).

Proactive push-type "marketing" of P2P-streams is facilitated by the inclusion of (almost) real-time swarming information into the metadata streams. The channels not currently being viewed by a viewing device are effectively advertised (announced) before they are selected by the user of the viewing device.

The overall system may contain more than one seeder for the video stream. In particular, it may have more than one device guaranteed to have all fragments of the video stream.

The above-described embodiment is described in relation to the distribution of a video stream. The technique may also be useful for other media streams such as an audio stream. The technique may also be useful for file distribution (such as the distribution of music files or video files and software downloads), for example in flash crowd situations where something very interesting becomes available.

In the above-described embodiment, the metadata server provides much of the benefits of a centralized video server without also needing to serve as a relay point for the distribution of the video streams themselves.

In the above-described embodiment, the metadata server (and also the DHT database) is non-critical to the swarm formation, since the swarm information is passed in the metadata stream distributed other than via the metadata server (and other than via the DHT database). This is especially valuable in flash crowd situations, which can arise when popular videos begin. The DHT database and/or metadata server are useful for preventing the swarm from partitioning into disjoint parts, which prevention is achievable without continuous availability of the metadata server and the DHT database.

With the above embodiment, because the swarm data stored at a viewing device is updated by the swarm information sent along with the video stream, the swarm data stored at a viewing device is effective for directing other viewing devices to other current members of the swarm even when the DHT database or metadata server is not available.

Appropriately adapted computer program code product may be used for implementing the functions of the seeder device, viewing devices and metadata server. The program code product for providing the operation may be stored on and provided by means of a carrier medium such as a carrier disc, card or tape. Another possibility is to download the program code product via a data network.

In the above-described embodiment, the seeder device, the viewer devices (swarm members) and the metadata server form a plurality of interrelated products of a system for the distribution of content.

The applicant draws attention to the fact that the present invention may include any feature or combination of features disclosed herein either implicitly or explicitly or any generalisation thereof, without limitation to the scope of any definitions set out above. In view of the foregoing description it will be evident to a person skilled in the art that various modifications may be made within the scope of the invention.

The invention claimed is:

1. Apparatus comprising a processor and a memory storing computer program code, wherein the memory and stored computer program code are configured, with the processor, to cause the apparatus to at least:
   generate a first message including a portion of a media stream or a portion of a data file; and
   generate a second message comprising the first message, the second message to be sent to one or more addressees, said second message further comprising information identifying one or more additional entities other than said one or more addressees and other than said apparatus from which one or more portions of said media stream or said data file can be obtained.

2. Apparatus according to claim 1, wherein the memory and stored computer program code are configured, with the processor, to cause the apparatus to generate said second message on the basis of information received from a managing entity associated with the distribution of said media stream or said data file.

3. Apparatus according to claim 1, wherein the memory and stored computer program code are configured, with the processor, to cause the apparatus to generate said second message on the basis of information received from a node which is one of: an addressee, an additional entity or a node in communication with at least one addressee or additional entity in a peer-to-peer network.

4. Apparatus according to claim 2, wherein the memory and stored computer program code are configured, with the processor, to further cause the apparatus to thereafter:
   generate a third message, the third message to be sent to one or more addressees, said third message including a further portion of said media stream or said data file; and
   generate a fourth message comprising said third message, the fourth message to be sent to said one or more second entities, said fourth message further including information identifying one or more additional entities other than said one or more addressees from which one or more portions of said media stream or said data file can be obtained, and which is generated on the basis of updated information received from said managing entity associated with the distribution of said media stream or said data file.

5. Apparatus comprising a processor and a memory storing computer program code, wherein the memory and stored computer program code are configured, with the processor, to cause the apparatus to at least:
receive a portion of a media stream or data file together with first information identifying the address of one or more entities involved in the distribution of said media stream or data file; and
cause said portion of a media stream or data file to be forwarded to another entity together with second information identifying the address of one or more entities involved in the distribution of said media stream or data file, wherein said second information includes said first information and the address of said apparatus, and wherein the address of one or more entities identified by the second information includes at least one address of an entity other than the apparatus and other than the another entity.

6. A method comprising:
generating at a first entity of a network a first message to be sent to one or more second entities of a network, wherein said first message includes a portion of a media stream or a data file;
and generating at said first entity a second message comprising the first message, the second message to be sent to said one or more second entities, said second message including information identifying one or more third entities other than said first entity and other than said one or more second entities, the third entities being entities from which one or more other portions of said media stream or said data file can be obtained.

7. A method according to claim 6, further comprising generating said second message on the basis of information received from a managing entity associated with the distribution of said media stream or data file.

8. A method according to claim 6, further comprising generating said second message on the basis of information received from a node which is one of: an addressee, an additional entity or a node in communication with at least one addressee or additional entity in a peer-to-peer network.

9. A method according to claim 7, further comprising thereafter:
generating a third message to be sent to one or more second entities of said network, said third message including a further portion of said media stream or said data file; and
generating a fourth message to be sent to said one or more second entities, said fourth message including updated information identifying one or more third entities other than said first entity and said one or more second entities and from which one or more portions of said media stream or said data file can be obtained, and which is generated on the basis of updated information received from said managing entity associated with the distribution of said media stream or said data file.

10. A method comprising:
receiving at a first entity a portion of a media stream or data file together with first information identifying the address of one or more entities involved in the distribution of said media stream or data file; and
causing said portion of a media stream or data file to be forwarded to another entity together with second information identifying the address of one or more entities involved in the distribution of said media stream or data file, wherein said second information includes said first information and the address of said first entity, and wherein the address of one or more entities identified by the second information includes at least one address of an entity other than the first entity and other than the another entity.

11. Apparatus comprising a processor and a memory storing computer program code, wherein the memory and stored computer program code are configured, with the processor, to cause the apparatus to at least:
generate at a second entity a first message requesting a portion of a media stream or a data file, the first message to be sent to a third entity of a network identified in information received from a first entity other than the third entity from which the second entity has received a further portion of said media stream or data file, wherein the information identifying the network is received in a second message further comprising the further portion of said media stream or data file.

12. Apparatus, according to claim 11, wherein said further portion of said media stream was received in reply to a request from the second entity to the first entity for a portion of said media stream or data file.

13. A method comprising:
generating at a second entity a first message requesting a portion of a media stream or data file, the first message to be sent to a third entity of a network identified in information received from a first entity other than the third entity from which the second entity has received a further portion of said media stream or data file, wherein the information identifying the network is received in a second message further comprising the further portion of said media stream or data file.

14. A method according to claim 8, wherein said further portion of said media stream or said data file was received in reply to a request from the second entity to the first entity for a portion of said media stream or said data file.

15. A computer program product comprising a non-transitory memory storing program code, which when loaded into a computer controls the computer to perform a method according to claim 13.

16. Apparatus comprising a processor and a memory storing computer program code, wherein the memory and stored computer program code are configured, with the processor, to cause the apparatus to at least:
generate at a managing entity of a network a message to be sent to an originator entity of a media stream or a data file, said message including information identifying one or more other entities of the network from which one or more portions of said media stream or said data file can be obtained, the originator entity configured to generate a message for distributing a portion of said media stream or a portion of said data file that includes said portion of said media stream or said portion of said data file and information identifying said one or more other entities of the network from which one or more portions of said media stream or said data file can be obtained.

17. A method comprising:
generating at a managing entity of a network a message to be sent to an originator entity of a media stream or a data file, said message including information identifying one or more other entities of the network from which one or more portions of said media stream or said data file can be obtained, the originator entity configured to generate a message for distributing a portion of said media stream or a portion of said data file that includes said portion of said media stream or said portion of said data file and information identifying said one or more other entities of the network from which one or more portions of said media stream or said data file can be obtained.

18. A computer program product comprising a non-transitory memory storing program code, which when loaded into a computer controls the computer to perform a method according to claim 11.

\* \* \* \* \*